US006687382B2

(12) United States Patent
Nagahara et al.

(10) Patent No.: US 6,687,382 B2
(45) Date of Patent: *Feb. 3, 2004

(54) INFORMATION PROCESSING APPARATUS, INFORMATION PROCESSING METHOD, AND INFORMATION PROVIDING MEDIUM

(75) Inventors: Junichi Nagahara, Tokyo (JP); Norio Fujimori, Kanagawa (JP); Takahiko Sueyoshi, Tokyo (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,896

(22) Filed: Jun. 28, 1999

(65) Prior Publication Data

US 2003/0053652 A1 Mar. 20, 2003

(30) Foreign Application Priority Data

Jun. 30, 1998 (JP) .......................................... 10-184352

(51) Int. Cl.[7] .................................................. G06K 9/00

(52) U.S. Cl. ....................... 382/100; 382/190; 382/107; 382/274; 84/600; 381/124

(58) Field of Search ................................ 382/190, 100, 382/108, 107, 170, 274; 345/582, 474; 356/396; 704/276; 340/514; 84/600, 645, 603; 381/124; 396/55

(56) References Cited

U.S. PATENT DOCUMENTS

| | | | | |
|---|---|---|---|---|
| 3,974,489 A | * | 8/1976 | Bleeker et al. | 340/261 |
| 4,658,427 A | | 4/1987 | Aubin | 381/124 |
| 4,903,312 A | * | 2/1990 | Sato | 382/170 |
| 5,159,140 A | | 10/1992 | Kimpara et al. | 84/600 |
| 5,286,908 A | | 2/1994 | Jungleib | 84/603 |
| 5,471,009 A | | 11/1995 | Oba et al. | 84/645 |
| 5,684,259 A | | 11/1997 | Horii | 84/600 |
| 5,689,078 A | * | 11/1997 | McClard | 84/600 |
| 6,047,134 A | * | 4/2000 | Sekine et al. | 396/55 |
| 6,084,169 A | * | 7/2000 | Hasegawa et al. | 84/600 |

FOREIGN PATENT DOCUMENTS

EP 0 306 602 A 3/1989

* cited by examiner

*Primary Examiner*—Bhavesh M. Mehta
*Assistant Examiner*—Barry Choobin
(74) *Attorney, Agent, or Firm*—Frommer Lawrence & Haug LLP; William S. Frommer; Hans R. Mahr

(57) ABSTRACT

An information processing apparatus comprising an image-sensing means for sensing an image of a subject, an extracting means for extracting predetermined feature data from the image sensed by the image-sensing means, a setting means for setting sound data to be reproduced and a reproducing means for reproducing the sound data set by the setting means according to the feature data extracted by the extracting means.

24 Claims, 16 Drawing Sheets

INFORMATION PROCESSING APPARATUS, INFORMATION PROCESSING METHOD, AND INFORMATION PROVIDING MEDIUM

BACKGROUND OF THE INVENTION

1. Field of the Invention

The present invention generally relates to an information processing apparatus, an information processing method, and an information providing medium and, more particularly, to an information processing apparatus, an information processing method, and an information providing medium that change, according to inputted image data, motions of a displayed object and sounds to be generated.

2. Description of Related Art

Conventional sound reproducing systems include a record player, a reproducing device using an optical disc, and a cassette tape recorder. These sound reproducing systems reproduce sound data recorded in advance on a recording medium.

Recently, users not satisfied with the simple reproduction of recorded sound data are increasingly turning to so-called computer music in which, for example, music is played by use of hardware and software and played music is recorded on a recording medium. Computer music also involves the automatic play of musical instruments. In the automatic play, recorded MIDI (Musical Instruments Digital Interface) sequence data for sound reproduction is supplied to a sound generator for sound output.

The above-mentioned computer music is based on a personal computer. Music is played and automatic performance is executed by operating the mouse, keyboard, touch panel, and other man-machine interfaces provided by the personal computer. Consequently, the performance of computer music requires input devices that the user can operate directly with the hand. This makes the above-mentioned computer music systems unsuitable for the enjoyment of live performance for example in which performers and audiences enjoy music by moving.

Generally, playing music and execution of automatic performance require special knowledge and techniques. Therefore, the practice of computer music requires specialists. Amateurs can only listen to reproduced music. However, some amateurs desire to arrange music on their own in a simple way.

SUMMARY OF THE INVENTION

It is therefore an object of the present invention to generate a sound and achieve changes to the motion and shape of an object displayed on the screen by changing the image sensed by a CCD (Charge Coupled Device) video camera for example.

According to a first aspect of the present invention, there is provided an information processing apparatus including an image-sensing means for sensing an image of a subject, an extracting means for extracting predetermined feature data from the image sensed by the image-sensing means, a setting means for setting sound data to be reproduced and a reproducing means for reproducing the sound data set by the setting means according to the feature data extracted by the extracting means.

According to a second aspect of the present invention, there is provided an information processing method including the steps of image-sensing an image of a subject, extracting predetermined feature data from the image sensed in the image-sensing step, setting sound data to be reproduced and reproducing the sound data set in the setting step according to the feature data extracted in the extracting step.

According to a third aspect of the present invention, there is provided an information providing medium for providing a program readable by a computer for making an information processing apparatus execute processing including the steps of image-sensing an image of a subject, extracting predetermined feature data from the image sensed in the image-sensing step, setting sound data to be reproduced and reproducing the sound data set in the setting step according to the feature data extracted in the extracting step.

According to the invention, an image of a subject is sensed, predetermined feature data is extracted from the sensed image, and sound data is reproduced according to the extracted feature data. This novel constitution allows the user to arrange music only by executing simple setting operations.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings. In order to clarify the correspondence between the claimed means of the invention and the following embodiment, each of these means is followed by an example of corresponding embodiment in parentheses. Obviously, this description will not in any manner restrict each means to the corresponding embodiment mentioned in parentheses.

An information processing apparatus according to claim 1 hereto comprises an image-sensing means (for example, a CCD video camera 23 shown in FIG. 1) for sensing an image of a subject, an extracting means (for example, step S22 shown in FIG. 18) for extracting predetermined feature data from the image sensed by the image-sensing means, a setting means (for example, step S2 shown in FIG. 9) for setting sound data to be reproduced, and a reproducing means (for example, step S25 shown in FIG. 18) for reproducing the sound data set by the setting means according to the data extracted by the extracting means.

An information processing apparatus according to claim 2 comprises a parameter setting means (for example, step S3 shown in FIG. 9) for setting parameters for controlling the motion of an object generated in response to the sound data set by the setting means and a display control means (for example, steps S12 and S13 shown in FIG. 17) for controlling the display of the object.

An information processing apparatus according to claim 3 comprises a recording means (for example, a HDD 56 shown in FIG. 6) for recording the data set by the setting means and the parameter setting means.

Figure 1:
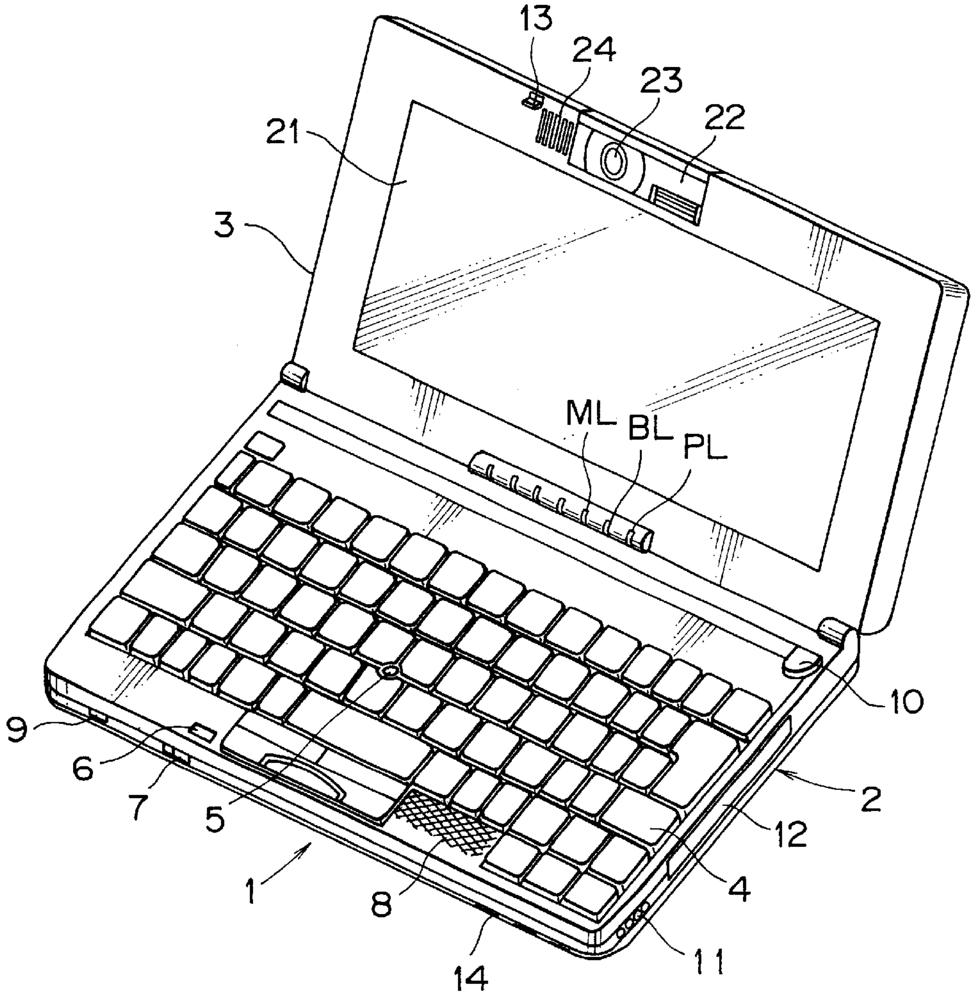
FIG. 1 is a perspective view illustrating an exemplary portable personal computer to which the present invention is applied with the display unit raised.
Figure 2:
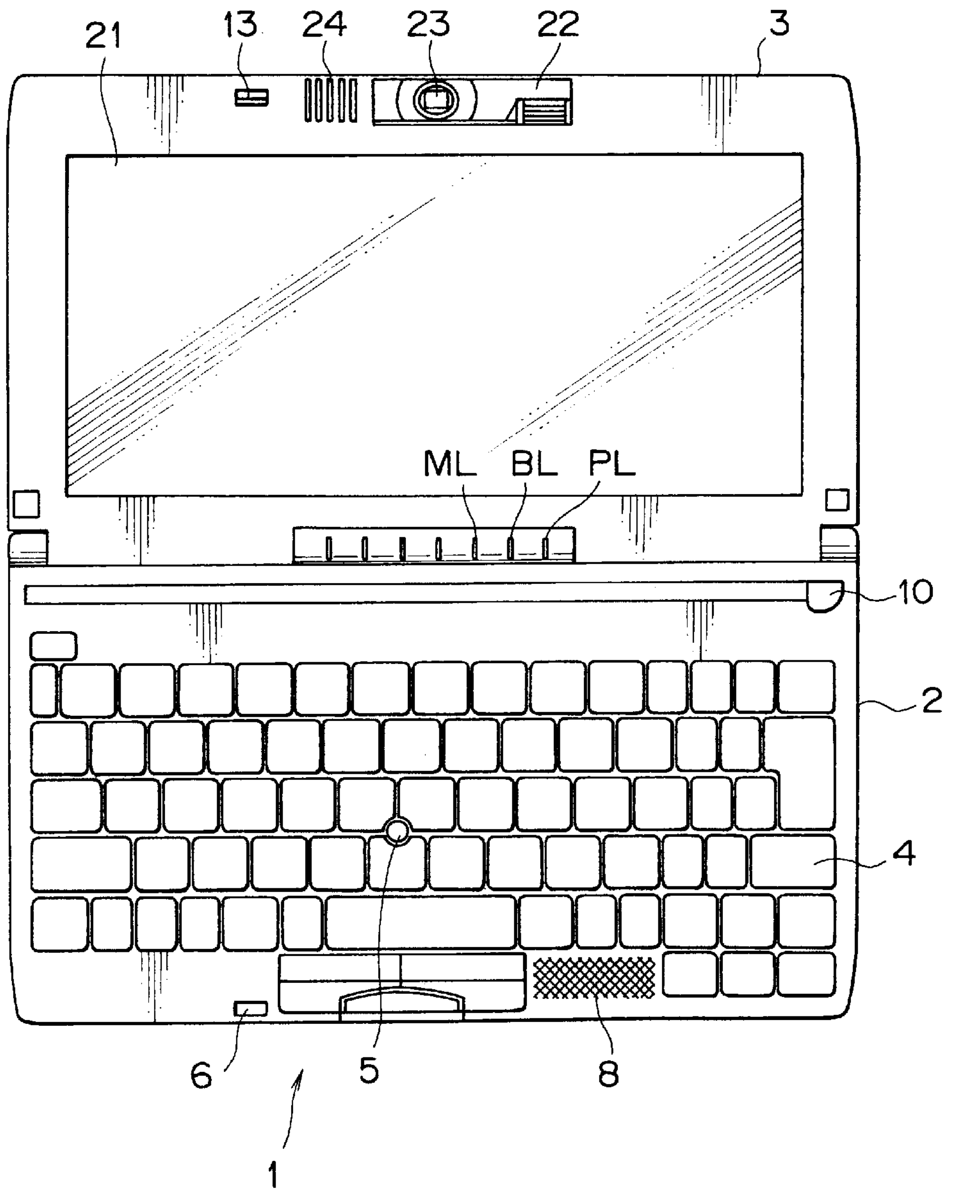
FIG. 2 is a top view of the portable personal computer of FIG. 1.
Figure 3:
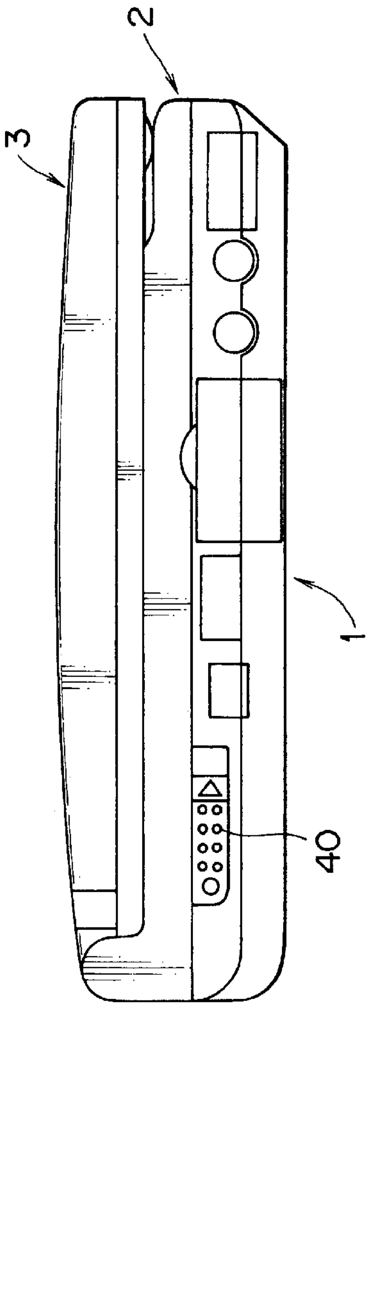
FIG. 3 is a left side view of the portable personal computer of FIG. 1 with the display unit closed.
Figure 4:
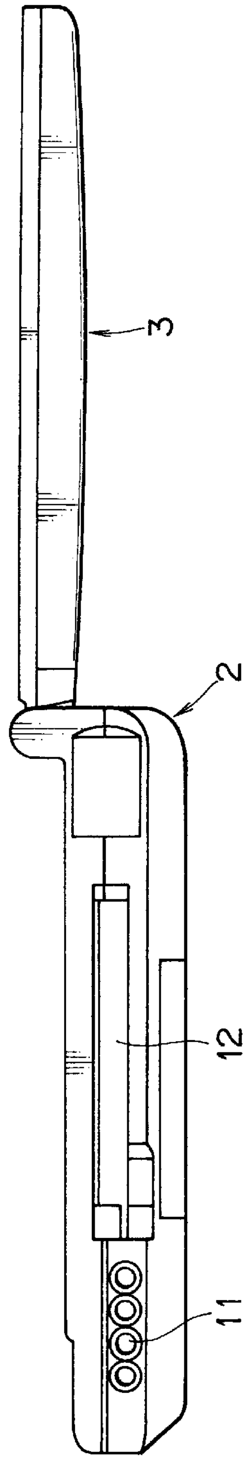
FIG. 4 is a right side view of the portable personal computer of FIG. 1 with the display unit raised to 180 degrees from the top of the main frame.
Figure 5:
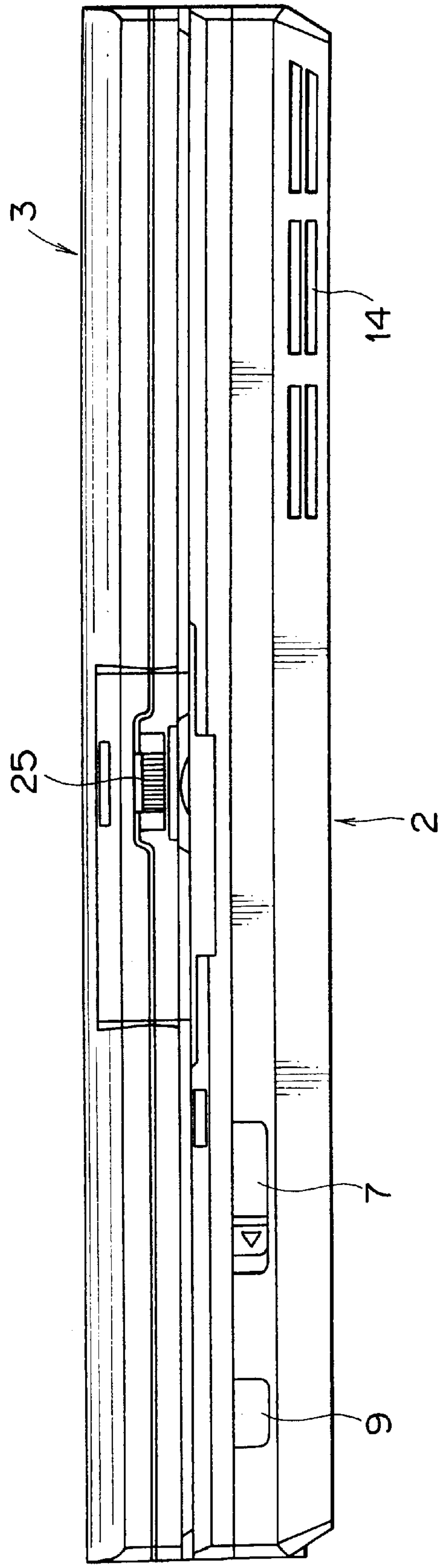
FIG. 5 is a front view of the portable personal computer of FIG. 3.
Figure 6:
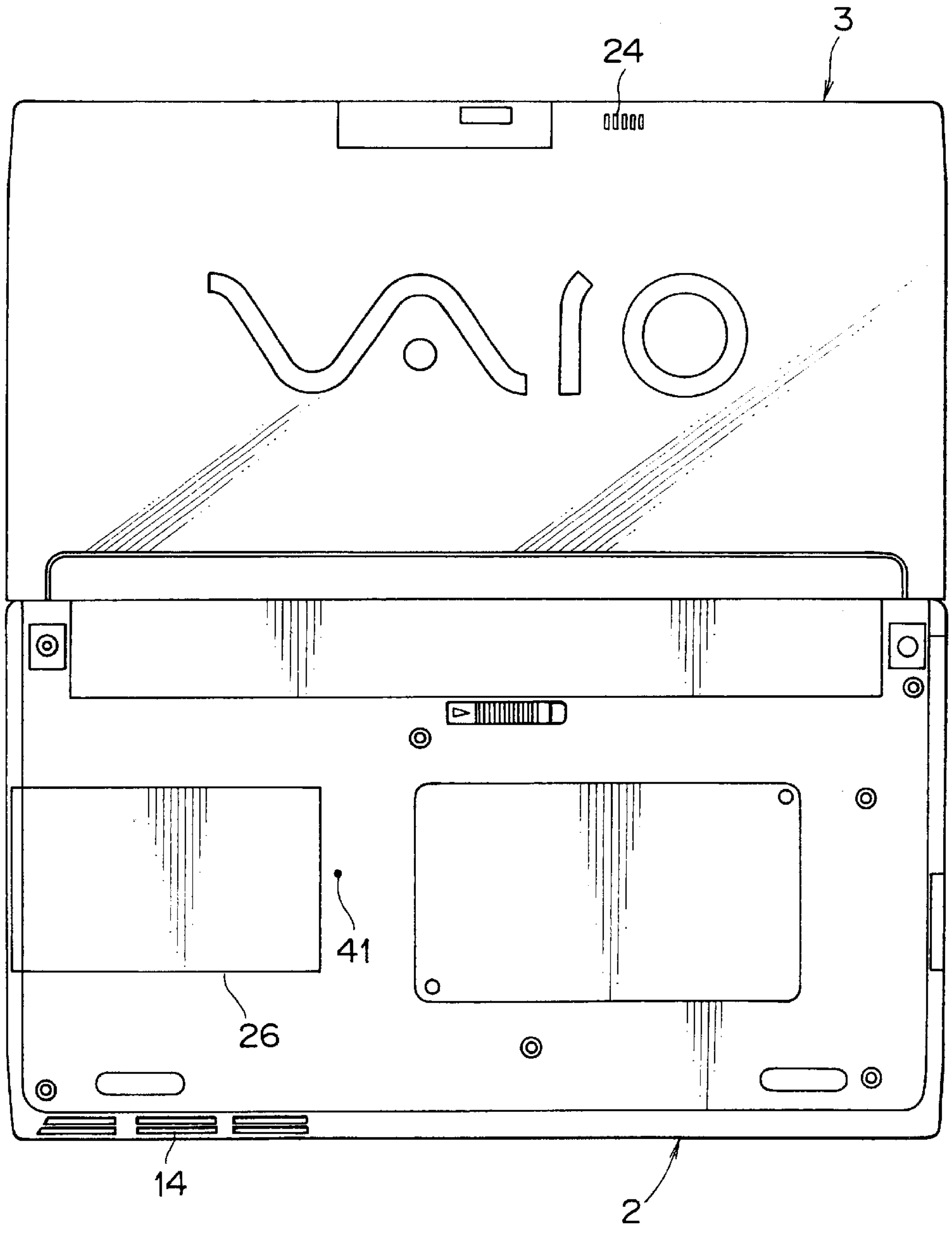
FIG. 6 is a bottom view of the portable personal computer of FIG. 4.

FIGS. 1 through 6 illustrate an exemplary constitution of a portable personal computer practiced as one preferred embodiment of the invention. In the figures, the personal computer 1 is of mini-note type, which is basically composed of a main frame 2 and a display block 3 pivotally mounted thereon. FIG. 1 perspectively illustrates the personal computer 1 with the display block 3 open relative to the main frame 2. FIG. 2 is a top view of the personal computer 1 shown in FIG. 1. FIG. 3 is a left side view illustrating the personal computer 1 shown in FIG. 1 with the display block 2 closed against the main frame 2. FIG. 4 is a right side view illustrating the personal computer 1 shown in FIG. 1 with the display block 3 open by 180 degrees relative to the main frame 2. FIG. 5 is a top view illustrating the personal computer 1 shown in FIG. 3. FIG. 6 is a bottom view illustrating the personal computer 1 shown in FIG 4.

The main frame 2 is arranged on the top thereof with a keyboard 4 that is operated to enter various characters and symbols and a Track Point (trademark) 5 that is operated to move the mouse cursor for example. The main frame 2 is further arranged on the top thereof with a speaker 8 for outputting sound and a shutter button 10 that is operated for image-sensing through a CCD video camera 23 disposed on the display block 3.

A claw 13 is disposed on the upper end of the display block 3. A hole 6 in which the claw 13 mates is disposed on the main frame 2 at a position that corresponds to the position of the claw 13 when the display block 3 is closed against the main frame 2. A slide lever 7 is disposed on the front face of the main frame 2 in a movable manner along the front face. The slide lever 7 is adapted to latch and unlatch the claw 13 mated in the hole 6. In the unlocked state, the display block 3 can be pivotally moved relative to the main frame 2. A microphone 24 is disposed beside the claw 13. As shown in FIG. 6, the microphone 24 can also pick up sound coming from the back of the personal computer 1.

The front face of the main frame 2 is also disposed with a programmable power key (PPK) 9. On the right-side face of the main frame 2, an exhaust port 11 is disposed as shown in FIG. 4. On the lower portion of the front face of the main frame 2, an intake port 14 is disposed as shown in FIG. 5. To the right of the exhaust port 11, a slot 12 is disposed for accommodating a PCMCIA (Personal Computer Memory Card International Association) card (a PC card in short).

On the top face of the display block 3, an LCD (Liquid Crystal Display) 21 is disposed for displaying images. On the upper end of the display block 3, an image-sensing block 22 is disposed in a pivotally movable manner relative to the display block 3. To be more specific, the image-sensing block 22 can pivotally move to any position in a range of 180 degrees at right angles to the vertical direction of the display block 3. The image-sensing block 22 has the CCD video camera 23.

In the lower portion of the display block 3, a power light PL, a battery light BL, a message light ML, and other light or lights each constituted by a LED (Light Emitting Diode) are arranged, facing the main frame 2. Reference numeral 40 shown in FIG. 3 denotes a power switch disposed on the left side face of the main frame 2. Reference numeral 25 shown in FIG. 5 denotes an adjustment ring for adjusting focus of the CCD video camera 23. Reference numeral 26 shown in FIG. 6 denotes a cover for an opening through which an add-on memory is installed in the main frame 2. Reference numeral 41 denotes a hole through which a pin is inserted to unlatch a claw locking the cover 26 to the main frame 2.

Figure 7:
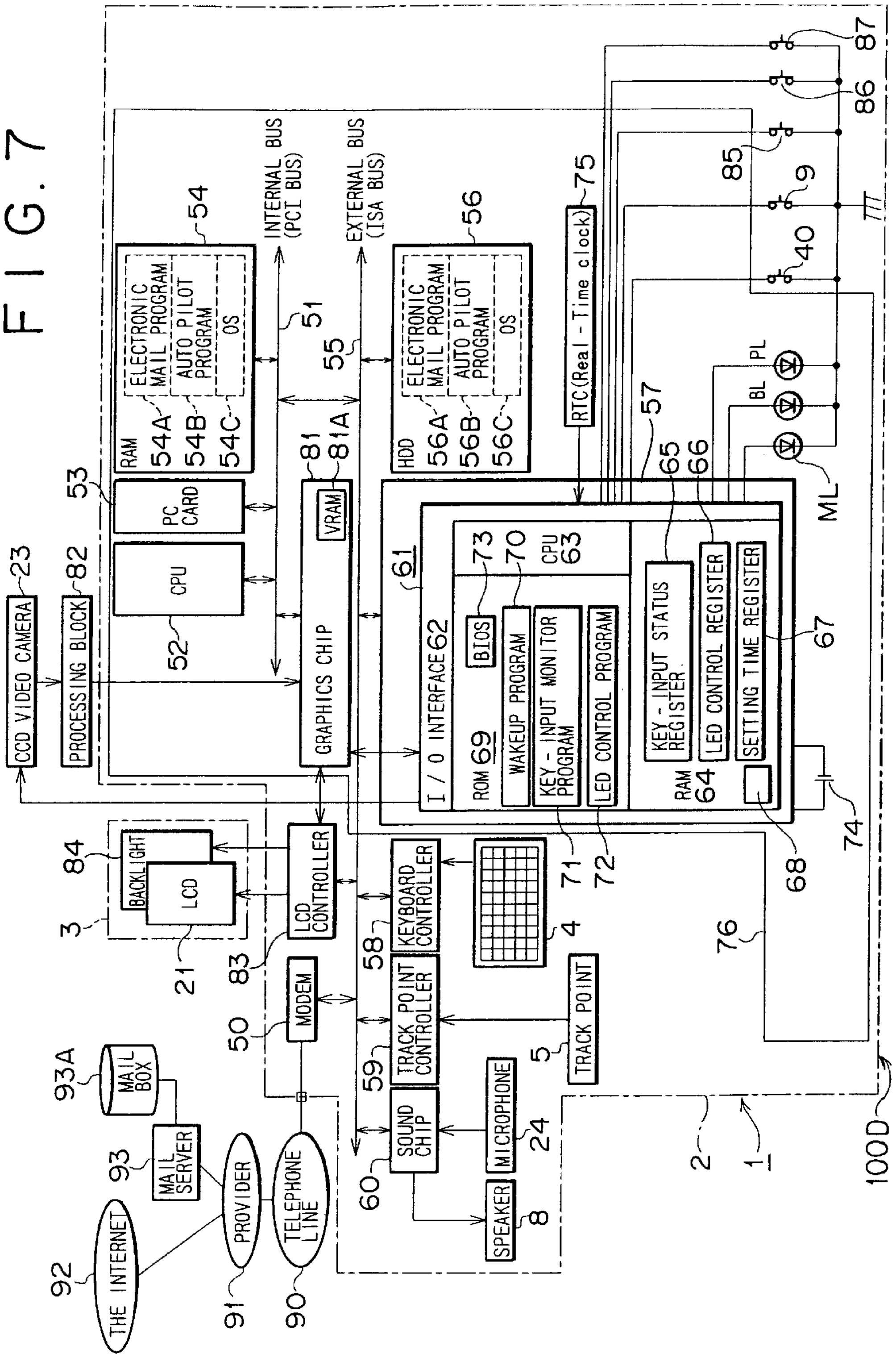
FIG. 7 is a block diagram illustrating an exemplary constitution of the circuitry of the portable personal computer of FIG. 1.

FIG. 7 exemplifies the internal constitution of the personal computer 1. As shown, an internal bus 51 is connected to a CPU (Central Processing Unit) 52, a PC card 53 that is inserted as required, a RAM (Random Access Memory) 54, and a graphics chip 81. The internal bus 51 is also connected to an external bus 55. The external bus 55 is connected to the hard disk drive (HDD) 56, an I/O (Input/Output) controller 57, a keyboard controller 58, a Track Point controller 59, a sound chip 60, an LCD controller 83, and a modem 50.

The CPU 52 controls the above-mentioned components of the personal computer 1. The PC card 53 is inserted to add an optional capability.

The RAM 54 stores, when the personal computer 1 starts, an electronic mail program (an application program) 54A, an auto pilot program (an application program) 54B, and an OS (Operating System) 54C from the HDD 56.

The electronic mail program 54A handles electronic messages transferred from a network through a communication line like telephone line. The electronic mail program 54A has an in-coming mail capturing capability as a particular capability. The in-coming mail capturing capability checks a mail box 93A of a mail server 93 for a mail addressed to that user and, if such a mail is found, captures the same.

The auto pilot program 54B sequentially starts plural preset processing operations (or programs) in a predetermined order.

The OS 54C controls basic computer operations exemplified by Windows 95 (trademark).

The HDD 56 on the external bus 55 stores an electronic mail program 56A, an auto pilot program 56B, and an OS 56C. These programs are sequentially sent into the RAM 54 at the time of booting-up.

The I/O controller 57 has a microcontroller 61 provided with an I/O interface 62. The microcontroller 61 is constituted by the I/O interface 62, a CPU 63, a RAM 64, and a ROM (Read Only Memory) 69 interconnected with each other. The RAM 64 has a key-input status register 65, a LED control register 66, a setting time register 67, and a register 68. The setting time register 67 is used to start a boot sequence controller 76 when a time (or a boot condition) set by user comes. The register 68 holds the correspondence between a preset operator key combination and an application program to be started. When the user enters this operator key combination, the corresponding application program (for example, the electronic mail program) starts.

The key-input status register 65 holds an operator key flag when the PPK 9 for single-touch operation is pressed. The LED control register 66 controls the turn-on/off of the message light ML that indicates the operating state of the application program (the electronic mail program) held in the register 68. The user can set any desired time to the time setting register 67.

A backup battery 74 is connected to the microcontroller 61, thereby preventing the values set to the registers 65, 66, and 67 from being cleared after the main frame 2 is powered off.

The ROM 69 in the microcontroller 61 stores a wakeup program 70, a key-input monitor program 71, and an LED control program 72 in advance. The ROM 69 is constructed of an EEPROM (Electrically Erasable and Programmable Read Only Memory) for example. The EEPROM is known as a flash memory. An RTC (Real Time Clock) 75A for always counting current time is also connected to the microcontroller 61.

The wakeup program 70 stored in the ROM 69 checks, based on the current time data supplied from the RTC 75, whether the time preset to the setting time register 67 has been reached. If the time is found reached, the wakeup program 70 starts a predetermined processing operation (or a predetermined program). The key-input monitor program 71 monitors the pressing of the PPK 9 by the user. The LED control program 72 controls the turn-on/off of the message light ML.

The ROM 69 also stores a BIOS (Basic Input/Output System) 73. The BIOS is a software program for controlling the transfer of data between the OS or an application software program and peripheral devices (the display monitor, the keyboard, and the hard disk drive).

The keyboard controller 58 connected to the external bus 55 controls the input made on the keyboard 4. The Track Point controller 59 controls the input made on the Track Point 5.

The sound chip 60 captures the input from the microphone 24 and supplies an audio signal to the built-in speaker 8.

The modem 50 connects the personal computer 1 to a communication network 92 such as the Internet or the mail server 93 through a public telephone line 90 or an Internet service provider 91.

Image data captured by the CCD video camera 23 is processed in a processing block 82 to be supplied to the graphics chip 81 connected to the internal bus 51. The graphics chip 81 stores the video data inputted from the CCD video camera 23 through the processing block 82 into a built-in VRAM (Video RAM) 81A and reads the stored video data as required and outputs the same to the LCD controller 83. The LCD controller 83 outputs the video data supplied from the graphics chip 81 for display. A back light 84 illuminates the LCD 21 from behind the same.

The power switch 40 turns on/off the power to the personal computer 1. A half-press switch 85 is turned on when the shutter button 10 is pressed to the half position. A full-press switch 86 is turned on when the shutter button 10 is fully pressed. A reverse switch 87 is turned on when the image-sensing block 22 is rotated 180 degrees (namely, when the CCD video camera 23 is rotated in the direction behind the LCD 21).

Figure 8:
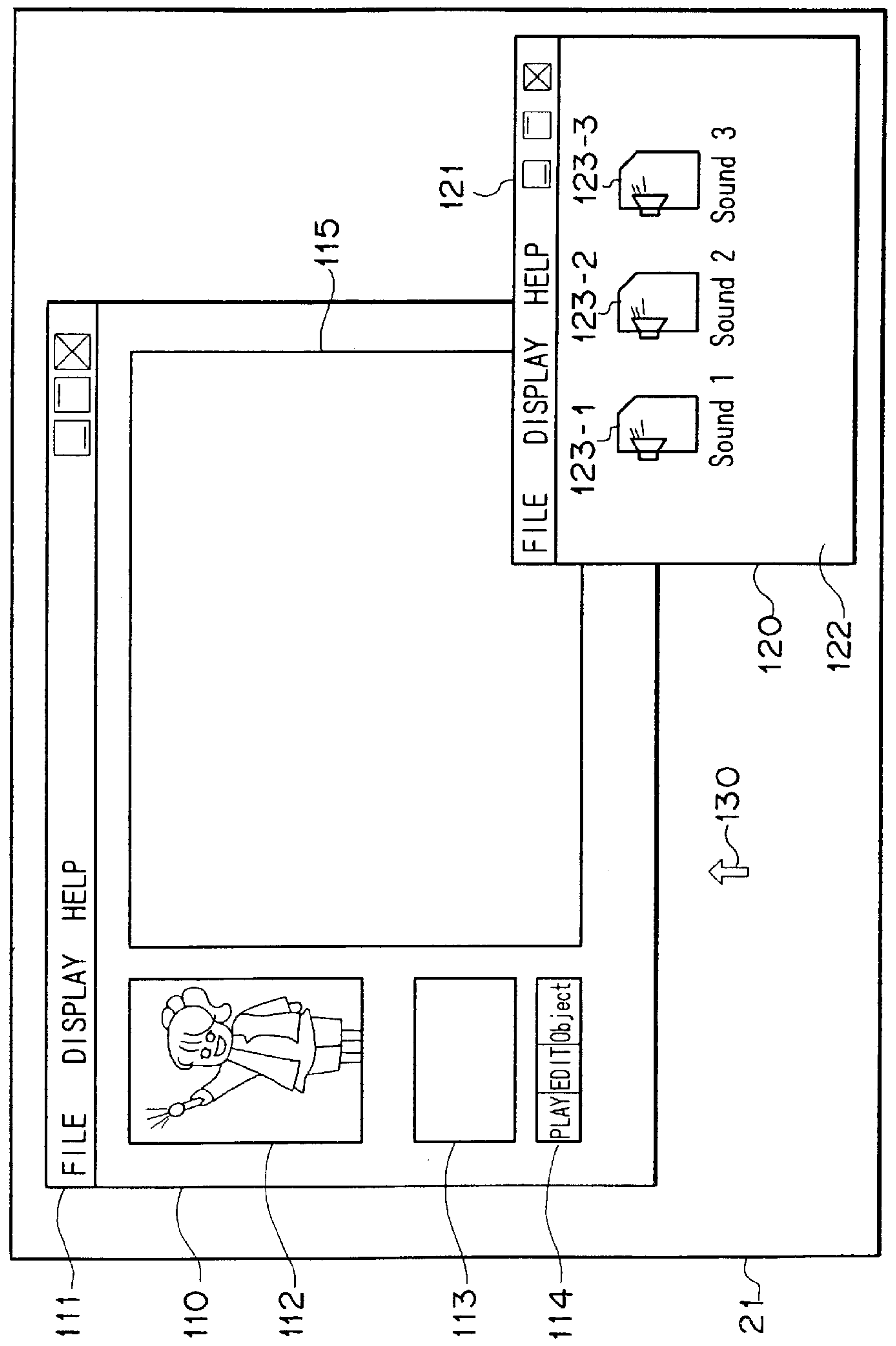
FIG. 8 is a diagram illustrating an example of screen displayed on the display unit.

FIG. 8 illustrates one example of a screen to be displayed on the LCD 21. Shown in this screen are a music composing window 110 and a sound file window 120. The music composing window 110 opens when music is composed by use of a sound file selected in the sound file window 120 and an image sensed by the CCD camera 23.

The music composing window 110 is made up of a selecting block 111 for changing the size or displayed contents of this window, an image block 112 for displaying an image sensed by the CCD video camera 23, a setting block 113 for setting the display of the image block 112 and the motion of a sound object (to be described later) to be displayed on a stage 115, and a command button 114 which is operated mainly when switching between the images of the setting block 113.

"File" in the selecting block 111 is operated to record the settings in this window to the HDD 56 or read data from the same. "Display" is operated to change the display screen setup of the music composing window 110 for example. "Help" is operated to get information about the operations of this system. When "File", "Display" and "Help" are operated, pull-down menus open. The three small boxes in the upper right corner of the selecting block 111 are used to expand or shrink the size of the music composing window 110 or close the same.

The image block 112 displays an image sensed by the CCD camera 23 or a grid mesh according to the data set in the setting block 113. In the display example of FIG. 8, the image shown is a person holding a light emitting object like a flashlight.

The setting block 113 sets the display of the image block 112 and shows screen for setting the motion of a sound object displayed on the stage 115 to be described later. Display examples of the setting block 113 will be described with reference to FIGS. 11A through 11D and FIGS. 14A through 14C.

Command button 114 "PLAY" is operated when the settings have all been made, creating a sound (tone). Command button 114 "EDIT" is operated to display a screen in the setting block 113 for setting conditions (or parameters) for sounding the created sound. Command button 114 "Object" is operated to set parameters associated with the motion of a sound object to be displayed on the stage 115.

The stage 115 displays a sound object corresponding to a sound file selected in the sound file window 120 by the user. The displayed sound object moves on the stage 115 according to the data set in the setting block 113.

The sound file window 120 is made up of a selecting block 121 and a file display block 122. The selecting block 121 is generally the same in constitution and operation as the selecting block 111. Therefore, the description of the selecting block 121 is skipped. The file display block 122 displays three sound file icons 123-1 through 123-3 (hereafter, these icons are generically refereed to simply as icon 123 if the distinction is not required). The files represented by these icons are named "SOUND 1", "SOUND 2" and "SOUND 3" respectively.

Each sound file contains PCM (Pulse Code Modulation) sound data such as of AIFF (Audio Interchange File Format) and WAVE (Waveform audio) format and data captured by MIDI for example. In addition, data recorded on a compact disc can be used as a sound file.

A cursor 130 moves in response to the operation of the Track Point 5 operated by the user.

It should be noted that the screen shown in FIG. 8 is exemplary and therefore another option may be provided to the selecting block 111 (or the selecting block 121) the options may be represented by icons.

Figure 9:
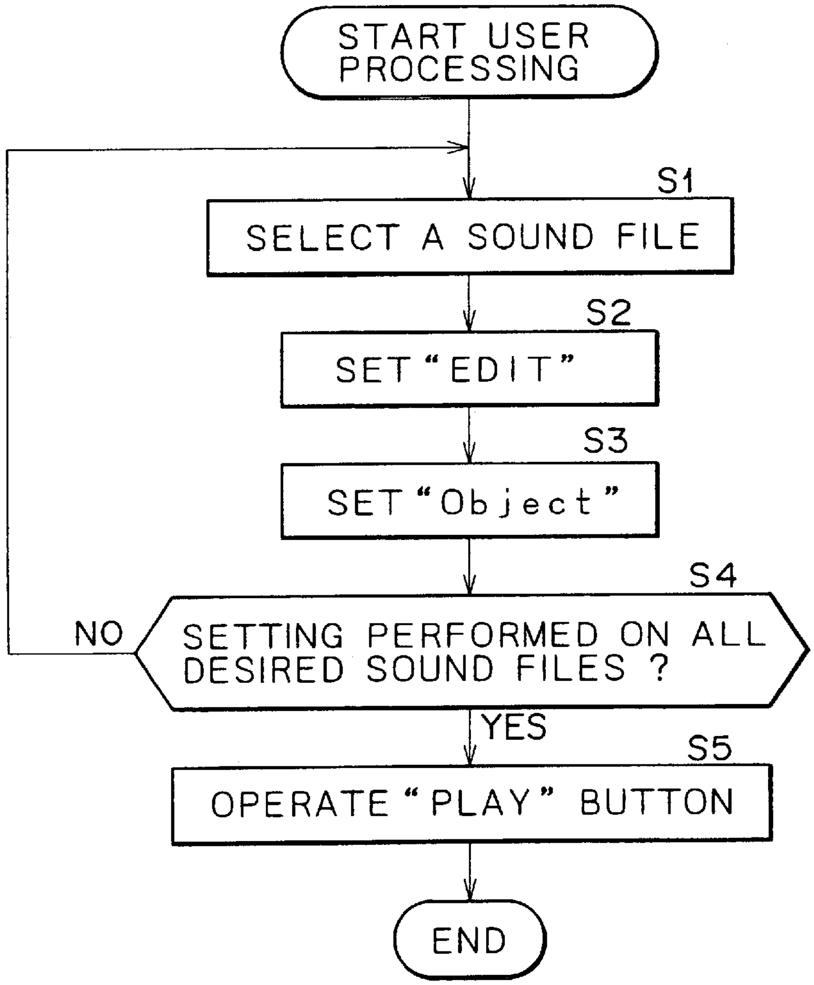
FIG. 9 is a flowchart for describing processing to be performed by the user.

The following describes, with reference to the flowchart of FIG. 9, the settings to be made by the user. In step S1, the user selects one sound file from the sound files (represented by icon 123) displayed in the file display block 122 of the sound file window 120. This selection is made by moving the cursor 130 to the icon 123 of a desired sound file, dragging the selected icon 123, and dropping the same onto the stage 115 of the music composing window 110.

Figure 10:
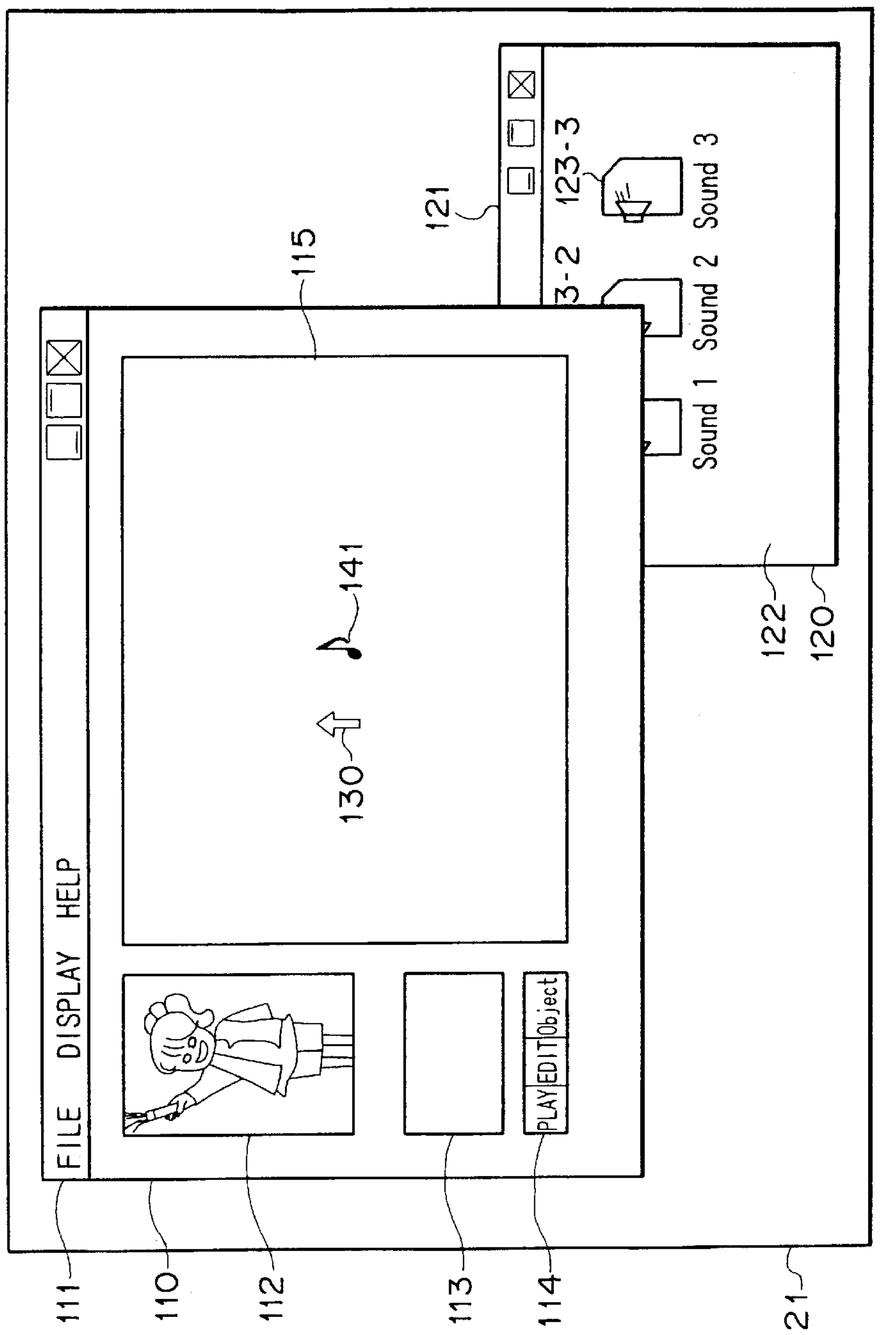
FIG. 10 is a diagram illustrating another example of screen displayed on the display unit.

FIG. 10 exemplifies a case in which the icon 123 has been selected as described above. The icon 123 dropped on the stage 115 is then displayed as a sound object 141 different in shape from the icon 123. In this example, the sound object 141 is shown in the shape of a musical note.

The sound object 141 may be a default picture imparted when the icon 123 has been dropped onto the stage 115, a picture created by the user, or an image captured from a digital camera for example. In this example, the stage 115 has no background picture. The user can set a desired picture as the background. The user can perform these settings by operating "Display" of the selecting block 111 and selecting and setting a necessary item of the pulldown menu. Alternatively, the user can select and set a necessary item by clicking the stage 115 by the right-side button of mouse. When the stage 115 is thus clicked, a pulldown menu appears in which the user selects a background picture in a dialog box displayed.

When the sound file selection is completed in step S1, then edit setting is made in step S2. The edit setting is effected by operating the command button 114 "EDIT" by use of the cursor 130. When the "EDIT" button is operated, a screen as shown in FIG. 11A appears in the setting block 113.

Figure 11A:
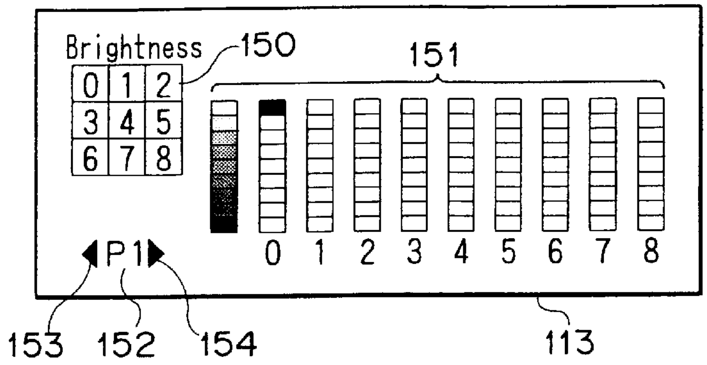
FIGS. 11A, 11B, 11C and 11D are diagrams illustrating examples of display in the setting box shown in the screen of FIG. 8.
Figure 12:
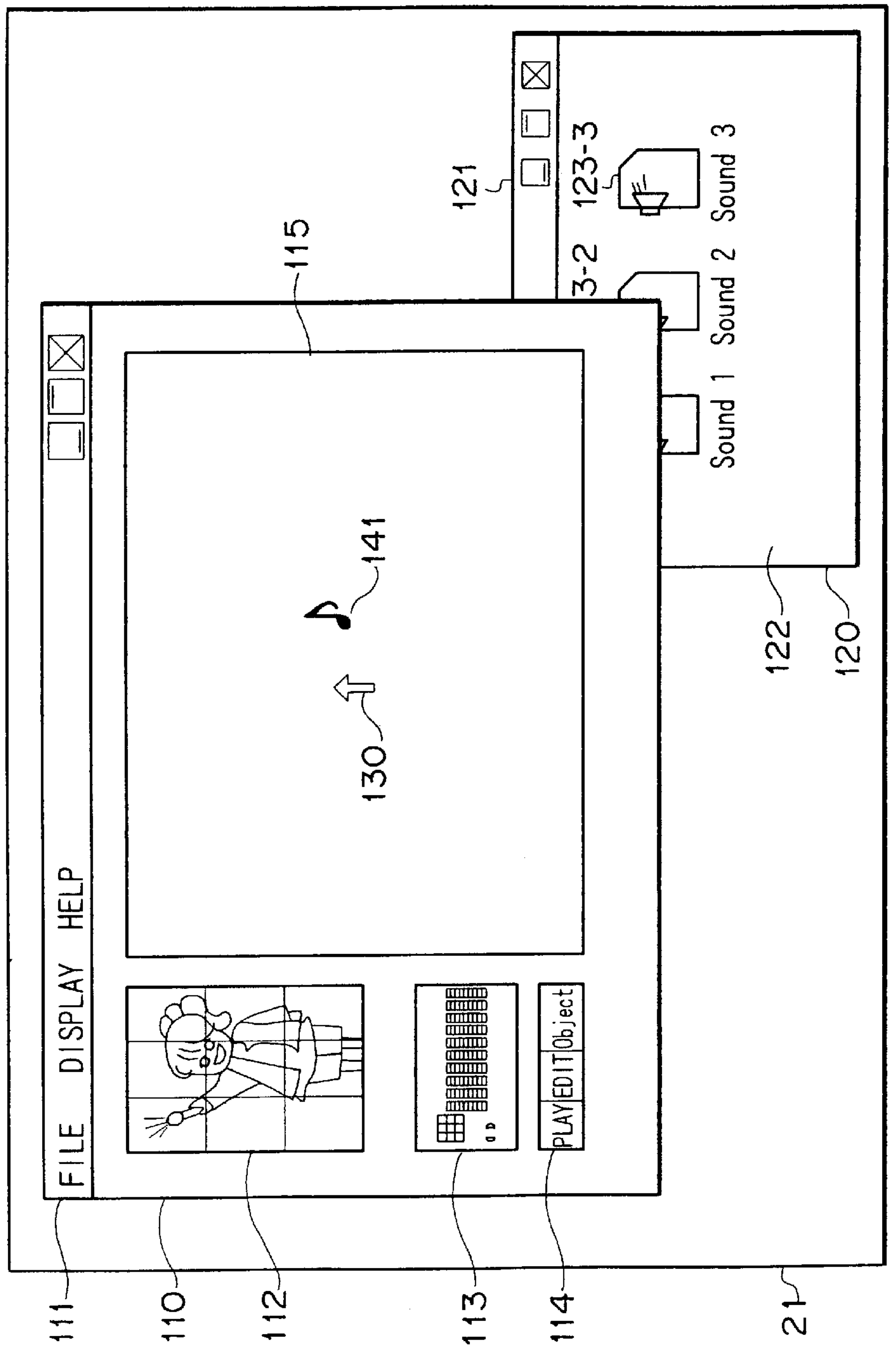
FIG. 12 is a diagram illustrating still another example of screen displayed on the display unit.

FIG. 11A illustrates a setting screen for changing the motion and sound of the sound object 141 by brightness. A matrix 150 composed of 9 squares shown in the upper left of the screen and the numbers 0 through 8 attached to these squares denote that the image block 112 is equally divided by 9. To be more specific, when the image shown in FIG. 11A is displayed in the setting block 113 as shown in FIG. 12, a grid is shown in the image block 112 to indicate that the image block 112 is divided into 9 equal portions. Each square making up the grid is hereafter referred to as a mesh as appropriate.

A brightness setting block 151 is made up of 9 bars numbered in correspondence to the matrix 150 and one brightness reference bar. The brightness reference bar is shown in gradation at the left end of the brightness setting block 151. The user references this bar to select a desired brightness.

In the screen shown in FIG. 11A, the user sets a brightness threshold. To be more specific, the user references the brightness reference bar, determines a box at desired brightness of the bar having the number corresponding to the mesh to be sounded, and clicks the selected box.

The example of FIG. 11A illustrates a state in which the brightest portion of the bar corresponding to the square 0 in the matrix 150 has been clicked for selection. The selected box is colored. In other words, any bar having no setting of brightness threshold has no colored box. It should be noted that, for one sound object 141, brightness thresholds may be set to plural bars.

Below the matrix 150, a page display block 152 is located for showing a page number. This brightness setting screen is page 1 for example. To the left of the page display block 152, a previous page display button 153 is located. To the right of the page display block 152, a next page display button 154 is located.

Figure 11B:
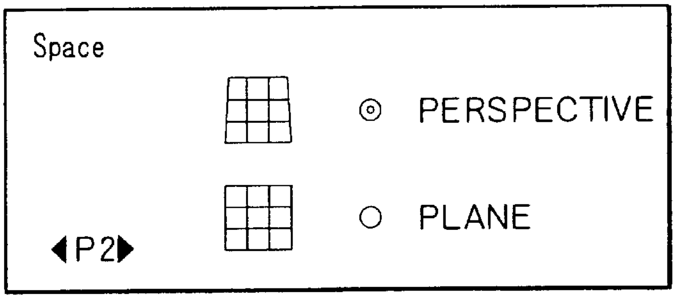

When the brightness has been set as described above, the user operates the next page display button 154, upon which a setting screen as shown in FIG. 11B is displayed in the setting block 113. In the newly displayed setting screen, the user sets a virtual space of the stage 115. "PERSPECTIVE" sets the stage 115 into a virtual three-dimensional space. Namely, the sound object 141 displayed on the stage 115 moves horizontally, vertically, and in depth direction in the virtual three-dimensional space. "PLANE" sets the stage 115 into a two-dimensional space. Namely, the sound object 141 displayed on the stage 115 moves horizontally and vertically in the two-dimensional space.

When moving on a same plane (or a two-dimensional space) horizontally or vertically, the sound object 141 does not change its size. However, when moving in the three-dimensional space, the sound object 141 increases its size as it comes forward and reduces its size as it goes into depth. The example of FIG. 11B shows a state in which "PERSPECTIVE" as a three-dimensional space is selected.

Figure 11C:
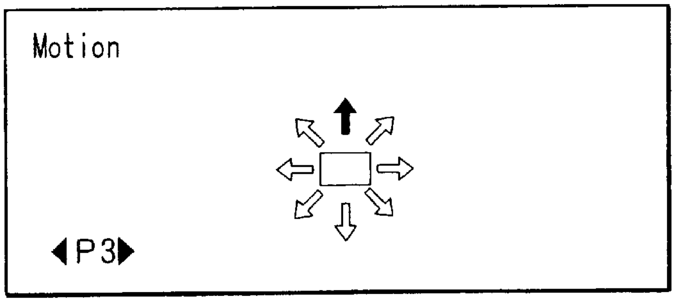

When the user operates the next page display button 154, a setting screen as shown in FIG. 11C is displayed. In the newly displayed setting screen, the user sets a direction in which the sound object 141 starts moving (that is, an initial value) when command button 114 "PLAY" is operated. In this example, the initial value is set so that the sound object 141 moves upward.

Figure 11D:
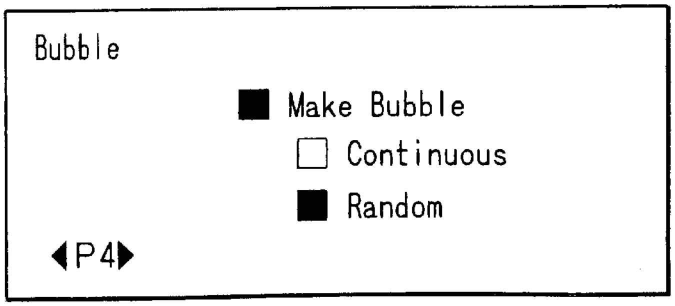

When the user operates the next page display button 154, a setting screen as shown in FIG. 11D is displayed. In this newly displayed screen, the user sets whether a bubble is to be generated or not. If a bubble is to be generated, then the user sets whether the bubble is to be generated continuously or randomly. In the example of FIG. 11D, generation of a bubble is set and the generation is made randomly.

Figure 13:
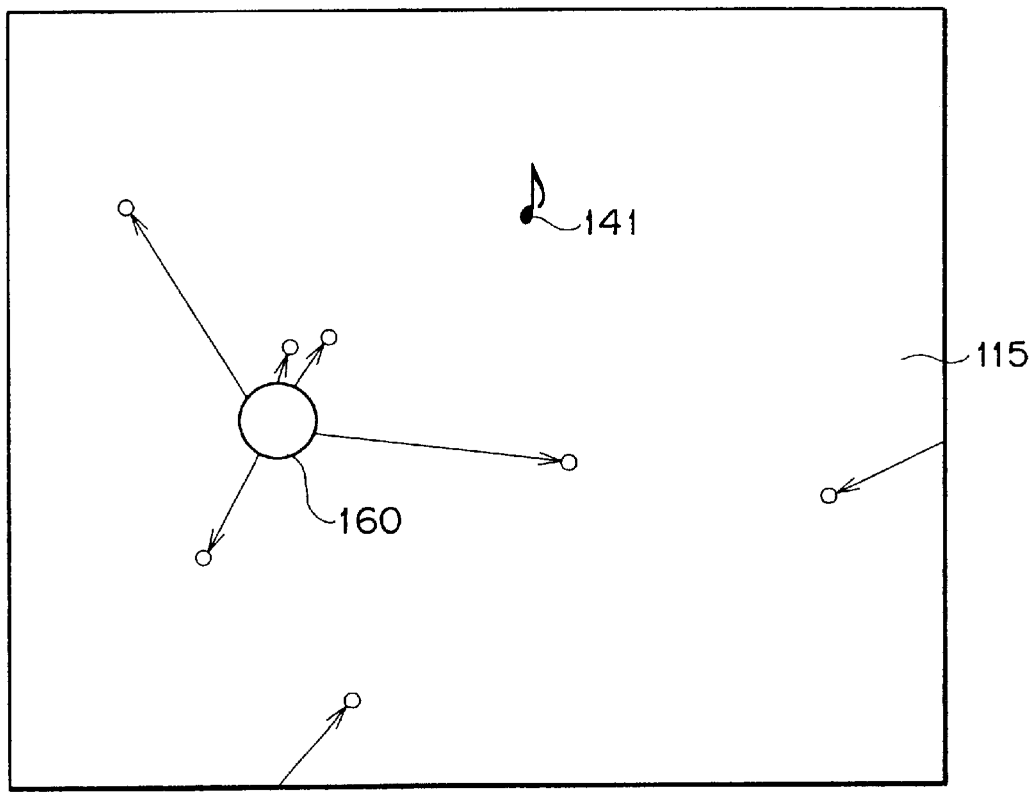
FIG. 13 is a diagram illustrating a pointer and bubbles.

When the bubble generation is set, a pointer 160 is displayed on the stage 115 as shown in FIG. 13. The pointer 160 is displayed such that it moves in response to a portion of the image in the image block 112 for which the motion vector is found fastest; for example, in response to the motion of a hand if the image shown in the image block 112 is a person waving his or her hand. The pointer 160 is so called because it points at a fastest-moving object.

The pointer 160 may take any shape and color. In the example of FIG. 13, the pointer 160 is spherical. From this pointer 160, spherical objects called bubbles are generated continuously or randomly. Bubbles are also generated from screen frames (walls) of the stage 115. When the sound object 141 hits one of these bubbles, the sound object 141 bounces from the bubble. The bubbles are adapted to hit the sound object 141, get out of the stage 115 through its walls, or disappear when a predetermined time has passed.

Now, returning to the flowchart of FIG. 9, when the user has completed the above-mentioned various setting operations in step S2, then, in step S3, the user sets a motion of the sound object 141. This setting starts by operating the command button 114 "Object". When the "Object" button is pressed, a screen shown in FIG. 14A is displayed in the setting block 113.

Figure 14A:
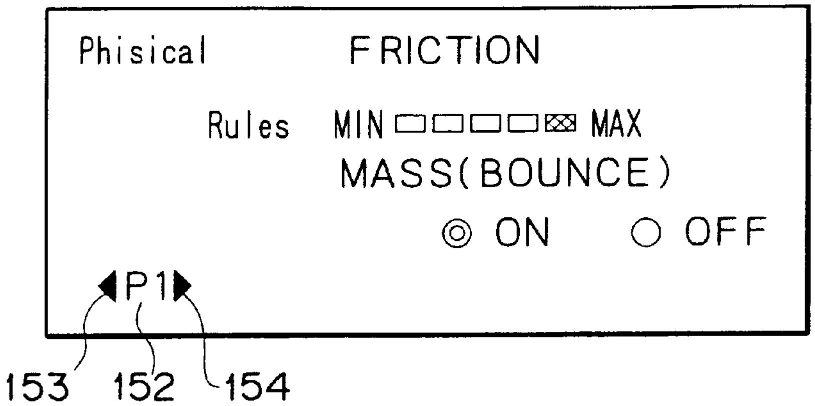
FIGS. 14A, 14B and 14C are diagrams illustrating examples of display in the setting box in the screen of FIG. 8.

In the setting screen shown in FIG. 14A, the user sets a parameter for determining the motion of the sound object 141. By "FRICTION", the user sets the friction between the sound object 141 and the stage 115. As the friction increases, the sound object 141 stops soon after it starts moving. As the friction decreases, the sound object 141 will not stop soon once it starts moving.

By "MASS (BOUNCE)", the user sets whether the sound object 141 is to have a mass or not. By clicking radio button "ON", the user can give a mass to the sound object 141. The sound object 141 given a mass bounces from another sound object or a bubble when hit by it ("bounce" means a change in direction in which the sound object 141 travels).

On the other hand, if the user sets that the sound object 141 is to be given no mass (that is, if the user clicks radio button "OFF"), hitting of another sound object or a bubble against the sound object 141 does not make the same bounce or the amount of bounce is small.

Figure 14B:
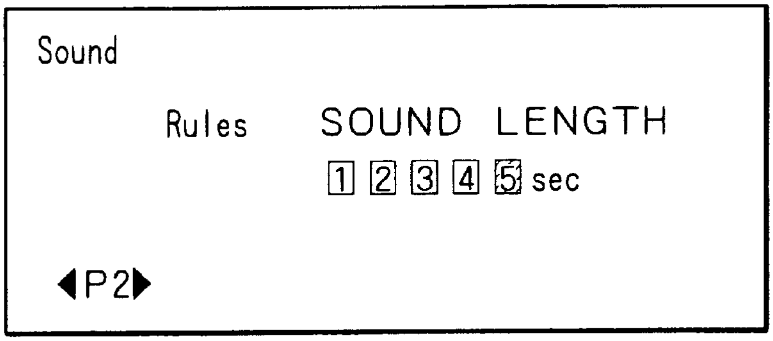

When the user has completed these setting operations and presses the next page display button 154, a screen as shown in FIG. 14B is displayed in the setting block 113. In this screen, the user sets a time in which a tone is sounded. Namely, since the sound object 141 is set so that a tone is sounded when a predetermined mesh of the image block 112 has reached a predetermined brightness, a sound length is set in this screen.

In the example of FIG. 14B, the sound length is adapted to be set to 1 to 5 seconds. When the corresponding mesh has reach a predetermined brightness, the sound object 141 sounds by the number of seconds set in this screen. The example of FIG. 14B shows a state in which the button is clicked on 5-second position and sounding is on.

Figure 14C:
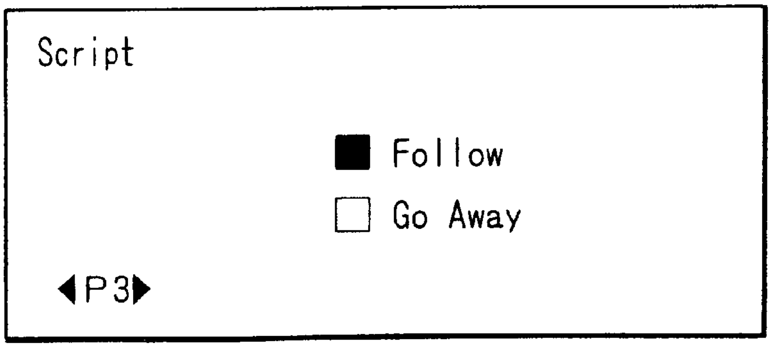

When the user has completed the sound length setting operation and operates the next page display button 154, a screen as shown in FIG. 14C is displayed. In this screen, the user sets a motion of the sound object 141 against the pointer 160. When the user turns on radio button "Follow", the sound object 141 moves along with the pointer 160. When the user turns on "Go Away", the sound object 141 moves away from the pointer 160.

When the user has completed the above-mentioned setting operations in step S3, the user goes on to step S4. In step S4, the user determines whether the above-mentioned setting operations have been performed on all desired sound files. If the decision is no, the user returns to step S1 and repeats the setting operations.

In the above-mentioned examples, in the processing of step S1, the user drags and drops the icon 123 displayed in the file display block 122 of the sound file window 120 to select a sound file and performs the processing operations of steps S2 and S3 on the selected sound file. Besides this sound file selection method, the user may first select plural sound files in the stage 115 and display the selected sound files as the sound objects 141. Then, the user may select one of the sound objects 141 and perform the processing operations of steps S2 and S3 on the selected sound object 141.

It should be noted that the processing operations of steps S2 and S3 may be replaced each other. In addition, in the "Edit" setting, a screen may be provided in which the sound object 141 is adapted to sound in response to a change other than that of brightness. Likewise, in the "Object" setting, a screen may be provided in which another setting is made.

Data such as the various parameters set as described above are stored as script data on the HDD 56 or a recording medium not shown. Thereafter, the above-mentioned processing operations need not be repeated, thus enhancing the ease of use. The recorded data may be modified in parameter or replaced in sound file as required. The script data itself is compatible with a text file, so that the script data may be edited by a text editor for example.

Figure 15:
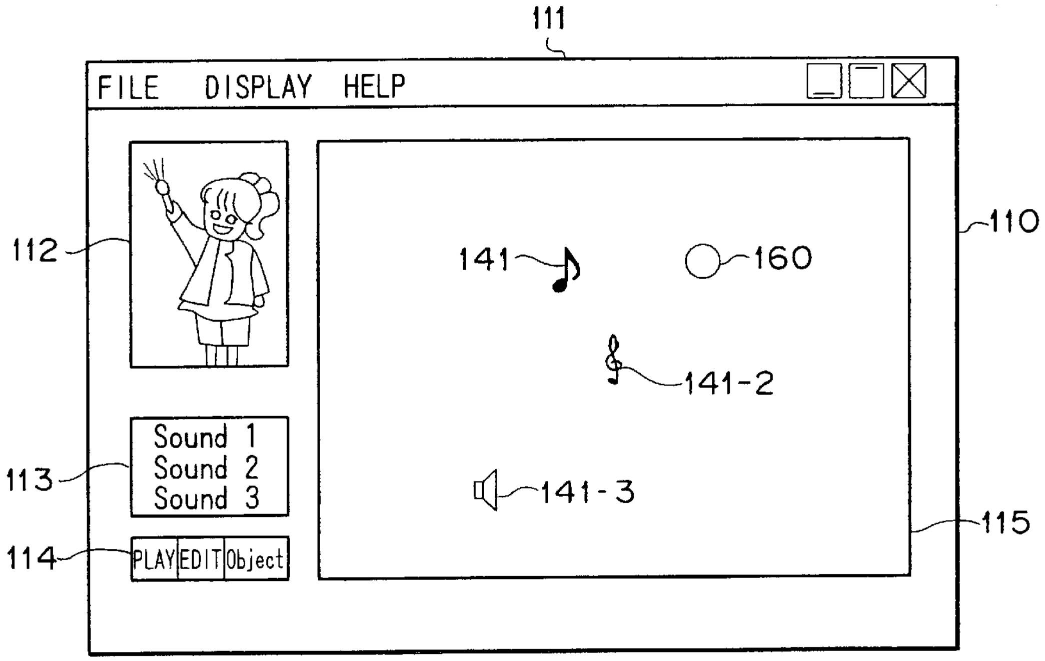
FIG. 15 is a diagram illustrating yet another example of screen displayed on the display unit.

If the user determines that the settings have been completed on all desired sound files, then the user goes on to step S5. In step S5, the user operates the command button 114 "PLAY". FIG. 15 shows an example in which three sound objects 141-1 through 141-3 are displayed as a result of performing various settings on three selected sound files.

As shown in the example of FIG. 15, when the user operates the "PLAY" command button, sound file names corresponding to the sound objects 141-1 through 141-3 displayed on the stage 115 are displayed in the setting block 113. The sound objects 141-1 through 141-3 are moving on the stage 115 according to the data set to them. These sound objects sound when the predetermined mesh of the image displayed in the image block 112 exceeds a preset brightness. The command button 114 "PLAY" is replaced by the "STOP" button, which the user presses to stop the above-mentioned motion.

Figure 16A:
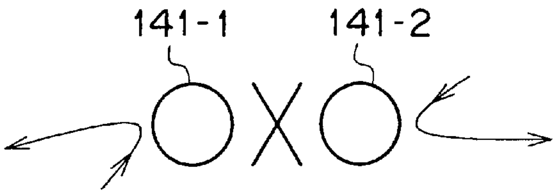
FIGS. 16A, 16B and 16C are diagrams illustrating motions of sound objects.

The following describes other motions of the sound object 141 than described above, with reference to FIGS. 16A through 16C. As shown in these figures, the sound object 141 is shown as a circle. FIG. 16A shows a collision between the sound objects 141-1 and 141-2. In this case, the sound objects 141-1 and 141-2 bounce from each other (the travel directions of these sound objects change). The magnitude of this bounce is determined by the parameter set in the above-mentioned "MASS" setting screen (FIG. 14A).

Figure 16B:
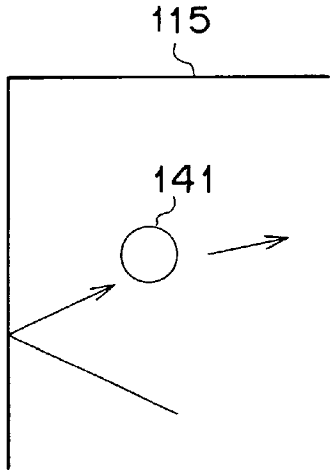

FIG. 16B shows that the sound object 141 hits one of the screen frame (wall) of the stage 115 and bounces. Thus, the sound object 141 is set to bounce from the wall of the stage 115, so that no situation occurs in which the sound object 141 goes through the wall out of the stage 115 to disappear. However, if the stage 115 is set as a three-dimensional space, the sound object 141 is displayed smaller as it moves farther into the depth of the space. Consequently, the sound object 141 may ultimately may look vanished from display.

Figure 16C:
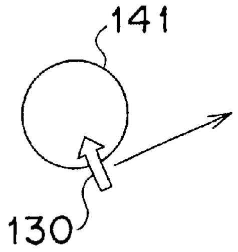

FIG. 16C shows that the user can drag the sound object 141 with the cursor 130. Thus, the present invention allows the user to directly control the motion of the sound object 141. The user also make setting so that the sound object 141 dragged out of the stage 115 will be deleted, thereby deleting all data associated with the sound object 141.

Thus, only setting the basic motions of the sound object 141 allows the sound object 141 to perform various motions by selecting combinations of the basic motions. Consequently, the user can enjoy sounds not only audibly but also visually.

Figure 17:
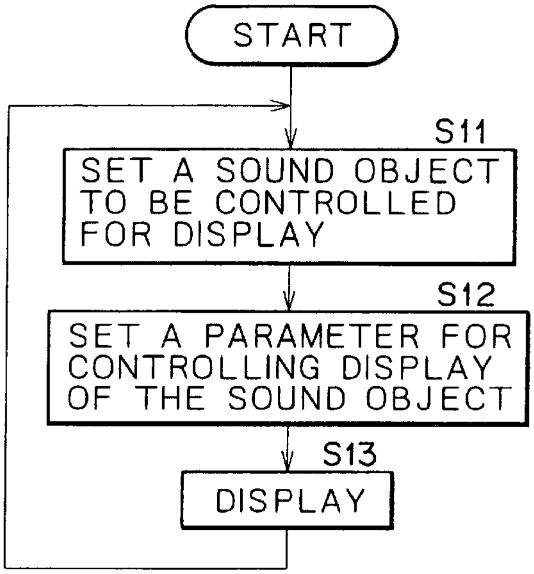
FIG. 17 is a flowchart for describing processing to be executed for displaying sound objects.

The following describes a procedure of controlling the displaying of the sound object 141 with reference to FIG. 17. In step S11, the user sets the sound object 141 to be controlled for display. In step S12, the user sets to the sound object 141 a parameter for controlling the displaying of the sound object 141 according to the above-mentioned display-control data already set by the user.

If the user has just pressed command button 114 "PLAY", the user sets the parameter for moving the sound object 141 in the direction set in the "Motion" screen (FIG. 11C).

If the sound object 141 is already moving on the stage 115, then the user determines whether this sound object 141 has collided with another sound object 141 or an bubble generated by the pointer 160. If the decision is yes, then the user determines whether the bounce is to be displayed or not according to the data set in the "MASS" setting screen (FIG.

14A). If the bounce is to be displayed, the user set XYZ-coordinates to which the bounced sound object 141 moves on the stage 115.

This coordinates setting allows the user to set a parameter for changing the size of the sound object 141 if the value of Z-coordinate changes. In the XYZ-coordinates setting, the user also considers the magnitude of the friction set in the "FRICTION" setting screen (FIG. 14A). Namely, if the magnitude of friction is large, the user must set the change in XYZ-coordinates to a relatively small level; if the magnitude of friction is small, the user must set the change in XYZ-coordinates to a relatively large level.

If the motion for the pointer 160 has been set in the "Script" setting screen (FIG. 14C), the user sets a parameter such that the displaying is controlled according to the setting.

Thus, when the user has set the parameters for controlling the displaying of the sound object 141, then, in step S13, the displaying of the sound object 141 is controlled according to the parameters and a control result is shown on the stage 115.

When the displaying of the sound object 141 ends in step S13, then, back in step S11, the user performs the display control setting on another sound object 141. The processing operations of step S12 and on are repeated.

It should be noted that the processing described in this flowchart is ended when the command button 114 "STOP" for example is operated as an interrupt.

Figure 18:
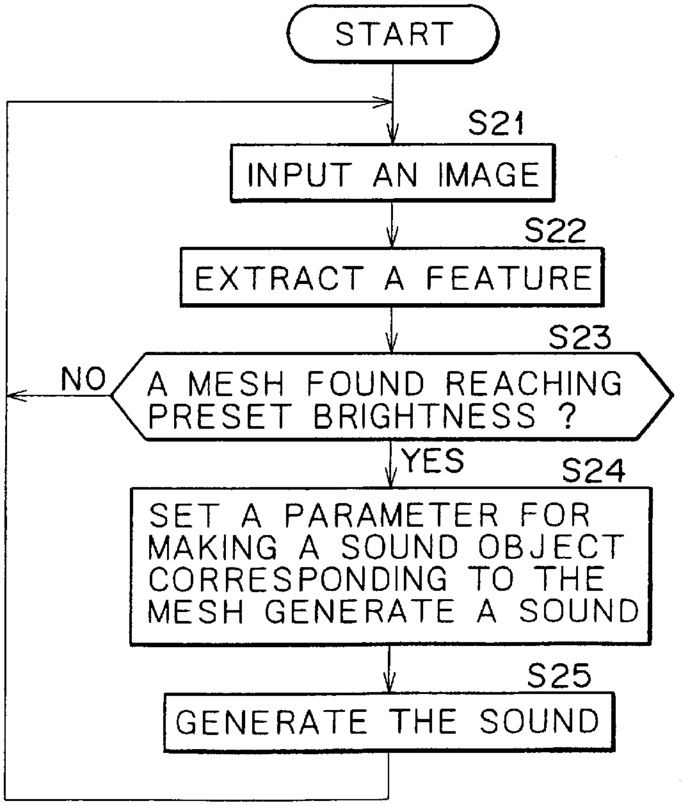
FIG. 18 is a flowchart for describing processing to be executed for a sound object to generate a sound.

The following describes how the sound object 141 sounds in response to the brightness with reference to a flowchart shown in FIG. 18. In step S21, an image sensed by the CCD video camera 23 is captured. The captured image data is sent to the processing block 82. In step S22, the processing block 82 executes feature extraction on the received image. The feature extraction performed here denotes the extraction of brightness.

The extracted brightness-associated data is sent through the graphics chip 81 to the microcontroller 61. In step S23, the CPU 63 of the microcontroller 61 checks, based on the brightness-associated data, for any mesh exceeding the brightness threshold set in the brightness setting screen (FIG. 11A). If the decision is no, then, back in step S21, the processing operations up to step S23 are repeated.

On the other hand, if the decision is yes in step S23, then the user sets in step S24 various parameters so that the sound object 141 generates a sound corresponding to a mesh found exceeding the brightness level set in step S23.

These parameters include the loudness of sound. The loudness of sound is associated with the size of the sound object 141 displayed on the stage 115. Namely, if the sound object 141 is displayed far in the depth of the stage 115 in a three-dimensional space and therefore the size of the sound object 141 is accordingly small, the loudness parameter is set so that the level of sound outputted from the sound object is accordingly low.

Conversely, if the sound object 141 is displayed forward on the stage 115 in a three-dimensional space and therefore the size of the sound object 141 is accordingly large, the loudness parameter is set so that the level of sound outputted from the sound object is accordingly high. If, for example, the sound object 141 moves from back to forward on the stage 115, the loudness parameter is set so that the loudness gradually becomes higher.

If, for example, the sound object 141 moves from right to left on the stage 115, the parameter is set so that the sound moves from right to left, or a sound image is localized from right to left. Thus, the user sets the sound loudness and localization and the sound length. The sound length is set so that the sound object 141 sounds for a time set in the sound length setting screen (FIG. 14B).

When the user has set the above-mentioned sounding parameters, the sound object 141 generates the sound accordingly in step S25. Then, the processing operations of step S21 through step S25 are repeated.

It should be noted that the processing described in this flowchart is ended when the command button 114 "STOP" for example is operated as an interrupt.

The following describes an exemplary use method of an apparatus applied with the information processing apparatus according to the invention in which an image displayed on the LCD 21 changes according to an image taken by the CCD video camera 23 and a sounded tone is changed accordingly.

When the personal computer 1 is used as a wordprocessor for example, a tone to be sounded by the above-mentioned processing may be used as background music and the sound object 141 displayed on the stage 115 as a screen saver.

If the CCD video camera 23 is set such that the same shoots the user, the user can control the motion of the displayed sound object 141 and sound the same by user's motion. Consequently, the apparatus to which the inventive information processing apparatus is applied can be used for live performance for example. This apparatus may also be used as a musical instrument. Further, if the CCD video camera 23 is set such that the same shoots a room door, a sound is generated in response to a person entering the room through the door. Consequently, this capability allows the user to set the apparatus used in a store for example such that a phrase "May I help you?" for example is sounded.

Obviously, the information processing apparatus according to the invention can be applied to other than the personal computer 1. The program providing medium for providing the computer program for executing the above-mentioned processing includes network transmission media such as the Internet and a digital satellite in addition to the information recording media such as magnetic disc and CD-ROM.

While the preferred embodiment of the present invention has been described using specific terms, such description is for illustrative purposes only, and it is to be understood that changes and variations may be made without departing from the spirit or scope of the appended claims.

What is claimed is:

1. An information processing apparatus comprising:

a setting means for setting sound data to be reproduced and for setting a respective mesh parameter to a respective value for each of two or more distinct meshes;

an image-sensing means for sensing an image of a subject, wherein each of said two or more distinct meshes corresponds to a respective portion of said sensed image;

an extracting means for extracting respective predetermined feature data from each of said two or more distinct meshes within said sensed image;

a comparison means for comparing the extracted feature data for a mesh to the value of the mesh parameter for that mesh for one or more of said two or more distinct meshes; and a reproducing means for reproducing said sound data according to the result of the one or more comparisons of said extracted feature data and said mesh parameters.

2. An information processing apparatus as claimed in claim 1, further comprising:

an object setting means for setting an object corresponding to said sound data;

a motion parameter setting means for setting a motion parameter for controlling motion of said object; and a display control means for controlling displaying motion of said object according to said motion parameter and the result of the one or more comparisons of said extracted feature data and said mesh parameters.

3. An information processing apparatus as claimed in claim 2, further comprising:

a recording means for recording said sound data and said motion parameter.

4. An information processing apparatus as claimed in claim 1, wherein:

said extracted feature data is data associated with brightness;

said setting means sets a respective brightness threshold as the value of the mesh parameter for each mesh;

said comparing means compares the brightness data of the mesh with the brightness threshold for that mesh; and said reproducing means reproduces said sound data if the result of any of the one or more comparisons of said extracted feature data and said mesh parameters indicates that the brightness data for a mesh exceeds the brightness threshold for that mesh.

5. An information processing method comprising:

setting sound data to be reproduced;

for each of two or more distinct meshes, setting a respective mesh parameter to a respective value;

image-sensing an image of a subject, wherein each of said two or more distinct meshes corresponds to a respective portion of said sensed image;

extracting respective predetermined feature data from each of said two or more distinct meshes within said sensed image;

for one or more of said two or more distinct meshes, comparing the extracted feature data for the mesh to the value of the mesh parameter for that mesh; and reproducing said sound data according to the result of the one or more comparisons of said extracted feature data and said mesh parameters.

6. An information processing method as claimed in claim 5, further comprising:

setting an object corresponding to said sound data;

setting a motion parameter for controlling motion of said object; and controlling displaying motion of said object according to said motion parameter and the result of the one or more comparisons of said extracted feature data and said mesh parameters.

7. An information processing method as claimed in claim 6, further comprising:

recording said sound data and said motion parameter.

8. An information processing method as claimed in claim 5, wherein:

said extracted feature data is data associated with brightness;

the value of the mesh parameter for each mesh is a brightness threshold for the mesh;

comparing the extracted feature data for a mesh to the value of the mesh parameter for that mesh includes comparing the brightness data of the mesh with the brightness threshold for that mesh; and reproducing said sound data includes reproducing said sound data if the result of any of the one or more comparisons of said extracted feature data and said mesh parameters indicates that the brightness data for a mesh exceeds the brightness threshold for that mesh.

9. An information providing medium for providing a program readable by a computer for making an information processing apparatus execute processing including:

setting sound data to be reproduced;

for each of two or more distinct meshes, setting a respective mesh parameter to a respective value;

image-sensing an image of a subject, wherein each of said two or more distinct meshes corresponds to a respective portion of said sensed image;

extracting respective predetermined feature data from each of said two or more distinct meshes within said sensed image;

for one or more of said two or more distinct meshes, comparing the extracted feature data for the mesh to the value of the mesh parameter for that mesh; and reproducing said sound data set in the setting step according to the result of the one or more comparisons of said extracted feature data and said mesh parameters.

10. An information providing medium as claimed in claim 9, said processing further including:

setting an object corresponding to said sound data;

setting a motion parameter for controlling motion of said object; and controlling displaying motion of said object according to said motion parameter and the result of the one or more comparisons of said extracted feature data and said mesh parameters.

11. An information providing medium as claimed in claim 10, said processing further including:

recording said sound data and said motion parameter.

12. An information providing medium as claimed in claim 9, wherein:

said extracted feature data is data associated with brightness;

the value of the mesh parameter for each mesh is a brightness threshold for the mesh;

comparing the extracted feature data for a mesh to the value of the mesh parameter for that mesh includes comparing the brightness data of the mesh with the brightness threshold for that mesh; and reproducing said sound data includes reproducing said sound data if the result of any of the one or more comparisons of said extracted feature data and said mesh parameters indicates that the brightness data for a mesh exceeds the brightness threshold for that mesh.

13. An information processing apparatus as claimed in claim 1, further comprising:

a pointer parameter setting means for setting a pointer parameter for controlling motion of a pointer;

a pointer control means for evaluating one or more motion vectors in said sensed image and determining the fastest motion vector among said one or more motion vectors; and a display control means for controlling displaying motion of said pointer based on said determined fastest motion vector and said pointer parameter.

14. An information processing apparatus as claimed in claim 1, wherein:

said setting means sets sound data from two or more sound files and sets a respective set of mesh parameters for each of said sound files; and said comparison means compares, for one or more meshes for each of said sound files, the extracted feature data for a mesh to the value of the mesh parameter for that mesh.

15. An information processing apparatus as claimed in claim 1, wherein:

at least two of said mesh parameters have different values.

16. An information processing apparatus as claimed in claim 2, wherein:

said reproducing means reproduces said sound data such that the reproduction of sound data is independent of the position of said object.

17. An information processing method as claimed in claim 5, further comprising:

setting a pointer parameter for controlling motion of a pointer;

evaluating one or more motion vectors in said sensed image;

determining the fastest motion vector among said one or more motion vectors; and controlling displaying motion of said pointer based on said determined fastest motion vector and said pointer parameter.

18. An information processing method as claimed in claim 5, wherein:

setting sound data includes setting sound data from two or more sound files;

setting respective mesh parameters includes setting a respective set of mesh parameters for each of said sound files; and comparing extracted feature data to values of mesh parameters for one or more of said two or more distinct meshes includes comparing, for one or more meshes for each of said sound files, the extracted feature data for a mesh to the value of the mesh parameter for that mesh.

19. An information processing method as claimed in claim 5, wherein:

at least two of said mesh parameters have different values.

20. An information processing method as claimed in claim 6, wherein:

in reproducing said sound data, the reproduction of sound data is independent of the position of said object.

21. An information providing medium as claimed in claim 9, said processing further including:

setting a pointer parameter for controlling motion of a pointer;

evaluating one or more motion vectors in said sensed image;

determining the fastest motion vector among said one or more motion vectors; and controlling displaying motion of said pointer based on said determined fastest motion vector and said pointer parameter.

22. An information providing medium as claimed in claim 9, wherein:

setting sound data includes setting sound data from two or more sound files;

setting respective mesh parameters includes setting a respective set of mesh parameters for each of said sound files; and comparing extracted feature data to values of mesh parameters for one or more of said two or more distinct meshes includes comparing, for one or more meshes for each of said sound files, the extracted feature data for a mesh to the value of the mesh parameter for that mesh.

23. An information providing medium as claimed in claim 9, wherein:

at least two of said mesh parameters have different values.

24. An information providing medium as claimed in claim 10, wherein:

in reproducing said sound data, the reproduction of sound data is independent of the position of said object.

* * * * *